Patented Apr. 8, 1930

1,753,509

UNITED STATES PATENT OFFICE

HARRY S. GEORGE, OF MASSAPEQUA, NEW YORK, ASSIGNOR TO ELECTRO METALLURGICAL COMPANY, A CORPORATION OF WEST VIRGINIA

METHOD OF SOLDERING

No Drawing.    Application filed May 2, 1927. Serial No. 188,406.

The invention is a new method of soldering.

Iron-chromium alloys such as stainless steel and chrome iron are difficult to solder with the solders and methods heretofore employed. Difficulties have also been met with in soldering hardened and tempered steel objects without affecting their temper or other physical properties. The present invention has for an object the soldering of either of the classes of materials above described without difficulty and without appreciably modifying the properties of such materials.

I have found that when the solder is applied to the parts to be soldered in conjunction with metallic sodium the solder is caused to firmly adhere. I attribute this to the fact that the sodium reduces the skin of oxide on the metal to be soldered thus leaving the reduced metal of the surface in condition to join readily with the molten solder. The action of the sodium is clearly more than one of fluxing as is indicated by the fact that the solder will not adhere to iron-chromium alloys of the type mentioned when the ordinary fluxes are used. Solders which have been used successfully are the ordinary silver solders. An example of a silver solder which may be used is one containing about 80% silver, 13% copper and 7% zinc. It will be understood, however, that the invention is applicable to other solders having a melting point sufficiently high so that when applied in the molten state they will thoroughly melt the sodium used and promote the oxide reducing action thereof.

The following will illustrate the application of the invention to the soldering of stainless steel compositions:

A stainless steel collar containing approximately 20% chromium was soldered to a spindle of similar composition by melting a globule of silver solder upon the surface to be soldered and then applying a small piece of metallic sodium to the solder. A violent reaction took place and after cooling the joint by withdrawing the source of heat the solder was found to have flattened out and to have become so firmly affixed to the alloy that it could not be detached even with a chisel and hammer.

The invention is also applicable to the soldering of articles which are in a cold condition. For example, a hardened and tempered steel article may be soldered by applying a small piece of sodium to the surface to be soldered and then applying a small quantity of molten solder. The molten solder furnishes the heat necessary to start the reduction by the sodium of the thin surface layer of oxide on the steel. The reaction is substantially instantaneous and the reduced metal joins readily with the molten solder. The heating which attends the soldering is confined to the immediate vicinity of the surface being soldered and consequently the physical properties of the hardened article are not substantially affected.

While sodium is preferred as the deoxidizing metal to be used because of its low cost and ready availability, it will be understood that other alkali metals such as potassium and lithium which have a strong affinity for oxygen and are capable of acting energetically as a reducing agent at the temperatures which attend the ordinary soldering operations may be used.

I claim:

1. The process of soldering which comprises placing molten solder on a surface to be soldered, and applying to the molten solder a piece of a metal having the powerful deoxidizing action and low melting point of sodium.

2. The process of soldering which comprises placing molten silver solder on a surface to be soldered, and applying to the molten solder a piece of a metal having the powerful deoxidizing action and low melting point of sodium.

3. The process of soldering which comprises placing molten silver solder on a chrome-iron surface, and applying to the molten solder a piece of a metal having the powerful deoxidizing action and low melting point of sodium.

In testimony whereof, I affix my signature.

HARRY S. GEORGE.